US012253951B1

(12) United States Patent
Favor et al.

(10) Patent No.: US 12,253,951 B1
(45) Date of Patent: Mar. 18, 2025

(54) MICROPROCESSOR WITH BRANCH TARGET BUFFER WHOSE ENTRIES INCLUDE FETCH BLOCK HOTNESS COUNTERS USED FOR SELECTIVE FILTERING OF MACRO-OP CACHE ALLOCATIONS

(71) Applicant: Ventana Micro Systems Inc., Cupertino, CA (US)

(72) Inventors: John G. Favor, San Francisco, CA (US); Michael N. Michael, Folsom, CA (US)

(73) Assignee: Ventana Micro Systems Inc., Cupertino, CA (US)

( * ) Notice: Subject to any disclaimer, the term of this patent is extended or adjusted under 35 U.S.C. 154(b) by 0 days.

(21) Appl. No.: 18/240,249

(22) Filed: Aug. 30, 2023

(51) Int. Cl.
*G06F 12/0875* (2016.01)
*G06F 12/0891* (2016.01)

(52) U.S. Cl.
CPC ...... *G06F 12/0875* (2013.01); *G06F 12/0891* (2013.01)

(58) Field of Classification Search
CPC ................ G06F 12/0875; G06F 12/0891
See application file for complete search history.

(56) References Cited

U.S. PATENT DOCUMENTS

| 7,590,825 | B2 | 9/2009 | Krimer et al. |
| 7,681,019 | B1 | 3/2010 | Favor |
| 7,797,517 | B1 | 9/2010 | Favor |
| 7,814,298 | B1 | 10/2010 | Thaik et al. |
| 7,870,369 | B1 | 1/2011 | Nelson et al. |
| 7,941,607 | B1 | 5/2011 | Thaik et al. |
| 7,949,854 | B1 | 5/2011 | Thaik et al. |
| 7,953,933 | B1 | 5/2011 | Thaik et al. |
| 7,953,961 | B1 | 5/2011 | Thaik et al. |

(Continued)

OTHER PUBLICATIONS

Rotenberg, Eric et al. "Trace Cache: a Low Latency Approach to High Bandwidth Instruction Fetching." *Proceedings of the 29th Annual IEEE/ACM International Symposium on Microarchitecture. MICRO 29,* Paris, France, 1996. pp. 24-34. doi: 10.1109/MICRO. 1996.566447.

(Continued)

*Primary Examiner* — Zachary K Huson
(74) *Attorney, Agent, or Firm* — E. Alan Davis; Huffman Law Group, PC (57) ABSTRACT

A microprocessor includes execution units that execute macro-operations (MOPs), a decode unit that decodes architectural instructions into MOPs, an instruction fetch unit (IFU) having an instruction cache that caches architectural instructions and a macro-operation cache (MOC) that caches MOPs into which the architectural instructions are decoded. A prediction unit (PRU) predicts a series of fetch blocks (FBs) in a program instruction stream to be fetched by the IFU from the MOC if hit or from the instruction cache otherwise. A branch target buffer (BTB) caches information about previously fetched and decoded FBs. A counter of each BTB entry is incremented when the entry predicts the associated FB is present again. For each FB in the series, the PRU indicates whether the counter has exceeded a threshold for use deciding whether to allocate the MOPs into the MOC in response to an instance of decoding the instructions into the MOPs.

29 Claims, 4 Drawing Sheets

(56) References Cited

U.S. PATENT DOCUMENTS

| | | | |
|---|---|---|---|
| 7,987,342 | B1 | 7/2011 | Thaik et al. |
| 8,032,710 | B1 | 10/2011 | Ashcraft et al. |
| 8,037,285 | B1 | 10/2011 | Thaik et al. |
| 8,103,831 | B2 | 1/2012 | Rappoport et al. |
| 8,370,609 | B1 | 2/2013 | Favor et al. |
| 8,499,293 | B1 | 7/2013 | Ashcraft et al. |
| 8,930,679 | B2 | 1/2015 | Day et al. |
| 9,524,164 | B2 | 12/2016 | Olson et al. |
| 10,579,535 | B2 | 3/2020 | Rappoport et al. |
| 2012/0311308 | A1* | 12/2012 | Xekalakis ............. G06F 9/3844 712/E9.045 |
| 2015/0100762 | A1 | 4/2015 | Jacobs |
| 2017/0139706 | A1* | 5/2017 | Chou .................. G06F 9/30189 |
| 2019/0188142 | A1 | 6/2019 | Rappoport et al. |
| 2019/0303161 | A1* | 10/2019 | Nassi .................. G06F 9/30054 |
| 2020/0110610 | A1 | 4/2020 | Lapeyre et al. |
| 2020/0125498 | A1* | 4/2020 | Betts ................... G06F 12/0897 |
| 2021/0026770 | A1 | 1/2021 | Ishii et al. |
| 2022/0107807 | A1 | 4/2022 | Schinzler et al. |
| 2023/0305962 | A1 | 9/2023 | Dutta |

OTHER PUBLICATIONS

Ren, Xida et al. "I see Dead μops: Leaking Secrets via Intel/AMD Micro-Op Caches." *2021 ACM/IEEE 48th Annual International Symposium on Computer Architecture (ISCA)*, Valencia, Spain, 2021. pp. 361-374. doi: 10.1109/ISCA52012.2021.00036.

Kotra, Jagadish B. et al. "Improving the Utilization of Micro-operation Caches in x86 Processors." *2020 53rd Annual IEEE/ACM International Symposium on Microarchitecture (MICRO)*, Athens, Greece, 2020. pp. 160-172 doi: 10.1109/MICRO50266.2020.00025.

Slechta, Brian et al. "Dynamic Optimization of Micro-Operations." HPCA '03: Proceedings of the 9th International Symposium on High-Performance Computer Architecture. Feb. 2003. pp. 1-12.

Petric, Vlad et al. "RENO: A Rename-Based Instruction Optimizer." ACM SIGARCH Computer Architecture News, vol. 33, Issue 2. May 2005. pp. 98-109.

Patel, Sanjay J. et al. "rePLay: A Hardware Framework for Dynamic Optimization." IEEE Transactions on Computers, vol. 50, No. 6. Jun. 2001. pp. 590-608.

Moody, Logan et al. "Speculative Code Compaction: Eliminating Dead Code via Speculative Microcode Transformations." 2022 55th IEEE/ACM International Symposium on Microarchitecture (MICRO) Chicago, IL. 2022. pp. 162-180.

Behar, Michael et al. "Trace Cache Sampling Filter." ACM Transactions on Computer Systems. Feb. 2007. pp. 1-10.

Friendly, Daniel Holmes et al. "Putting the fill unit to work: dynamic optimizations for trace cache microprocessors." MICRO 31: Proceedings of the 31st Annual ACM/IEEE International Symposium on Microarchitecture. Nov. 1998. pp. 173-181.

Burtscher, Martin et al. "Load Value Prediction Using Prediction Outcome Histories." 1999 Technical Report CU-CS-873-98. Department of Computer Science, University of Colorado. pp. 1-9.

Appendix to the specification, 25 Pages, Mail room date Jul. 23, 2007, Doc code APPENDIX, referred to as "Appendix A" at col. 4, lines 46-47 of U.S. Pat. No. 7987342 to Thaik et al. issued Jul. 26, 2011; downloaded Jul. 23, 2024 from https://patentcenter.uspto.gov/applications/11880862/ifw/docs?application=.

Appendix to the specification, 28 Pages, Mail room date Jul. 23, 2007, Doc code APPENDIX, referred to as "Appendix B" at col. 4, lines 48-49 of U.S. Pat. No. 7987342 to Thaik et al. issued Jul. 26, 2011; downloaded Jul. 23, 2024 from https://patentcenter.uspto.gov/applications/11880862/ifw/docs?application=.

White Paper. "Security Analysis of AMD Predictive Store Forwarding." Advanced Micro Devices, Inc. (AMD). Aug. 2023. pp. 1-7.

Liu, Chang et al. "Uncovering and Exploiting AMD Speculative Memory Access Predictors for Fun and Profit." 2024 IEEE International Symposium on High-Performance Computer Architecture (HPCA). Mar. 2-6, 2024. pp. 1-15.

* cited by examiner

MICROPROCESSOR WITH BRANCH TARGET BUFFER WHOSE ENTRIES INCLUDE FETCH BLOCK HOTNESS COUNTERS USED FOR SELECTIVE FILTERING OF MACRO-OP CACHE ALLOCATIONS

BACKGROUND

Microprocessors process data by fetching instructions from memory, typically referred to as system memory, and executing the fetched instructions. In conventional systems, the time required to fetch a block of instructions from system memory is on the order of one hundred clock cycles of the microprocessor. For this reason, high-performance microprocessors include one or more cache memories, or simply caches, into which the fetched instructions are stored. The cache is many orders of magnitude smaller than the system memory and, unlike the system memory, is typically included within the same integrated circuit that includes the one or more processing cores of the microprocessor. As a result, the time required to fetch an instruction from the cache, assuming it is found there, is typically an order of shorter than a fetch from system memory. The performance of the microprocessor may be significantly improved in accordance with the percentage of time instructions are found in the cache when needed, which is commonly referred to as the cache hit rate.

The cache hit rate may be affected by different characteristics of the cache. One of the characteristics is the size of the cache, i.e., the number of instructions the cache can hold. Generally, the larger the cache the higher the hit rate. Another characteristic that may affect the hit rate is the cache line size, which is the number of sequential bytes of instructions that are held together in an entry of the cache, e.g., 64 bytes.

Yet, another characteristic that may affect the hit rate is the replacement policy of the cache. When a new cache line of instructions is to be put into the cache, the replacement policy determines which entry of the cache will be replaced with the new cache line of instructions. Caches are commonly arranged as set associative caches having many sets each having multiple ways and each way having an entry for holding a cache line of instructions. A given memory address selects a set among the many sets. Each set includes replacement information used to implement the replacement policy. That is, the replacement information is used to decide which way of the selected set will be replaced. The replacement information indicates the usage history of the entries in the set relative to one another. When an entry of a given set is used because the entry is hit upon by the memory address that specifies the next one or more of the instructions to be fetched, the replacement information of the set is updated to reflect the use, such as the frequency of use or recency of use. For example, a popular replacement scheme is least-recently-used (LRU), or variations thereof, for which the replacement information may generally be characterized as maintaining a relative age of each entry with respect to its use. Each time the set is accessed, the replacement information for the set is updated to reflect the usage of the used entry and the non-usage of the other entries in the set. In an LRU replacement scheme, when the need arises to allocate an entry for a new cache line of instructions, the cache selects the least recently used way in the set for replacement as indicated by the replacement information.

Micro-Ops and Micro-Op Caches

Modern microprocessors are typically separated essentially into a front-end whose job is to fetch instructions and provide a stream of instructions to a back-end that executes the fetched instruction stream. The back-end includes execution units that are the functional units of the microprocessor that perform arithmetic, logical, memory or other operations to accomplish the semantics of the instructions of the program. The instructions fetched from system memory and cached in the cache of a microprocessor may be referred to as architectural instructions. Architectural instructions conform to the instruction set architecture (ISA) of the microprocessor, popular examples of which are x86, ARM, SPARC, MIPS, RISC-V, among others.

Modern microprocessors typically decode, or translate, architectural instructions into micro-operations, or simply micro-ops. The execution units in fact execute micro-ops rather than architectural instructions. For example, an execution unit performs the operations specified by a micro-op on source operands from source registers specified by the micro-op to produce a result operand that is written to a destination register specified by the micro-op and that may be used by other micro-ops as a source operand. Analogously to the fact that architectural instructions conform to the ISA of the microprocessor, micro-ops conform to a micro-architectural "micro-instruction set architecture" of the micro-architecture of the microprocessor. Unlike the ISA which is visible to programmers and/or compilers that write/generate programs using architectural instructions, the micro-instruction set architecture is not visible to programmers and compilers. Rather, the micro-architecture is defined by the designers of the microprocessor, and two microprocessors that conform to the same ISA but that are designed by different designers will almost certainly have different micro-architectural instruction sets.

The differences between architectural instructions and micro-ops may vary widely depending upon the ISA and the microarchitecture. For example, in the x86 ISA, the architectural instructions may be very complex, as evidenced by the fact that the length of an instruction may be in the tens of bytes. As a result, a complex x86 instruction may be decoded into several micro-ops. This was particularly true after the emergence of reduced instruction set computers (RISC) in the 1980's, after which the trend was often toward keeping the back-end as RISC-like as possible and the micro-ops relatively simple.

The complexity and power consumption required by the decode logic that decodes the architectural instructions into micro-ops may also vary widely depending upon the ISA. Using the x86 ISA again as an example, instructions can be variable length, ranging from a single byte to tens of bytes. Consequently, the decode logic for an x86 processor can be very complex and power consuming. This is especially true for a high-performance superscalar out-of-order back-end design that requires a high rate of micro-ops per clock cycle to consume. In such processors the decode is typically performed by multiple pipeline stages over multiple clock cycles. The longer the decode pipeline, the greater the decode latency, which may increase power consumption as well as the penalty associated with branch mispredictions, for example. Furthermore, there are often multiple decode pipelines that operate in parallel to provide micro-ops at the rate needed by the high-performance back-end, which may increase the power consumption even further.

Micro-op caches have been included in some high-performance microprocessors to supply micro-ops to the back-end at a high rate, to reduce decode latency, and to reduce power consumption. As the decode logic decodes architectural instructions into micro-ops, the micro-ops are allocated into the micro-op cache so that if the program instruction stream again includes the same architectural instructions, the associated micro-ops can be fetched from the micro-op cache. Fetching the micro-ops from the micro-op cache eliminates the need to decode the corresponding architectural instructions and eliminates the need to fetch the corresponding architectural instructions from the instruction cache, which may result in both a reduction in power consumption and decode latency, which may translate into higher performance. Fetching the micro-ops from the micro-op cache may also facilitate the ability to supply micro-ops to the back-end at a higher rate than when fetching architectural instructions from the instruction cache and decoding them into micro-ops.

Just as it is desirable to have a high hit rate in an architectural instruction cache, so also it is desirable to have a high hit rate in a micro-op cache so that the benefits of lower power consumption and higher performance may be experienced more often. Thus, as described above with respect to architectural instruction caches, micro-op caches have conventionally been designed to include replacement information to implement a replacement policy to decide which entry in the implicated set of the micro-op cache to replace. In an LRU replacement scheme, for example, when the decode logic decodes architectural instructions into a new group of micro-ops, the least recently used entry is selected for replacement, i.e., the new group of micro-ops is allocated into the least recently used entry.

Typically, there is no question about whether or not to allocate an entry in the micro-op cache for the new group of micro-ops. The only question is which entry in the selected set will be replaced to perform the allocation. However, it has been observed that generally speaking programs tend to have a relatively small percentage of instructions that are frequently executed and a relatively large percentage of instructions that are infrequently executed. Indeed, some instructions may only be executed once. Thus, a consequence of an "always allocate" policy is that in some instances—perhaps a significant percentage of instances—the new group of micro-ops might only have been executed the one time or may be executed relatively infrequently and in that case may unfortunately replace a group of micro-ops that is more frequently used than the new group of micro-ops, resulting in inefficient use of the micro-op cache. In a more sophisticated scheme, the micro-op cache may examine the replacement information and if none of the entries in the set is sufficiently old, e.g., the usage history indicates all the entries currently in the set have been used sufficiently recently, then the micro-op cache decides not to replace any of the current entries in the set, i.e., not to allocate an entry in the micro-op cache for the new group of micro-ops and to instead retain all the groups of micro-ops currently in the set.

DETAILED DESCRIPTION

As described above, many conventional approaches always allocate into the micro-op cache new micro-ops as they are decoded from fetched architectural instructions of the program instruction stream. Always allocating into the micro-op cache may result in replacing more useful micro-ops already in the micro-op cache, since it is not known how soon nor how frequently the new micro-ops will appear again in the program instruction stream-indeed it is not known if they will even appear again at all. Similarly, a policy of allocating based on the unworthiness of micro-ops already in the micro-op cache does not consider how soon/ frequently the new micro-ops will appear again, if at all, in the program instruction stream.

In the present disclosure, a fetch block (FB) is a sequential run of architectural instructions in a program instruction stream and/or the micro-ops into which the architectural instructions are decoded.

Embodiments are described that filter allocations into the micro-op cache based on a fetch block's usage history before the fetch block is allocated into the micro-op cache. That is, the embodiments allocate into the micro-op cache based on the worthiness of the new fetch block of micro-ops, in contrast to a conventional method that always attempts to allocate each time the micro-ops are decoded and in contrast to a conventional method that filters based on the unworthiness of micro-ops already in the micro-op cache. The worthiness of a fetch block to be allocated into the micro-op cache based on its history of appearance in the program instruction stream is typically referred to herein as the "hotness" of the fetch block. Stated alternatively, in each instance that the fetch block is predicted to be present in the program instruction stream, the appearance history of the fetch block itself, rather than the appearance history of other fetch blocks already in the micro-op cache, is considered when making the decision whether or not to allocate the fetch block into the micro-op cache.

In an embodiment, the usage history of fetch blocks is held in corresponding entries of a branch target buffer (BTB) in a prediction unit at the beginning of the microprocessor pipeline. The usage history is in the form of a hotness counter that is incremented when an entry in the BTB is hit upon and used as a prediction that the corresponding fetch block is present again in the program instruction stream. The new micro-ops of the fetch block are not allocated into the micro-op cache unless the hotness counter has exceeded a hotness threshold, indicating the fetch block is sufficiently worthy, based on its prior usage history, to be allocated into the micro-op cache. This contrasts with conventional designs that simply always allocate or that decide whether to allocate based on unworthiness (e.g., infrequently, or unrecently used) of all the micro-ops already in the implicated set of the micro-op cache. Essentially, the prediction unit drives the allocation decision rather than an "always allocate" policy or rather than a replacement policy of the micro-op cache. The embodiments may result in a higher micro-op cache hit rate, e.g., by avoiding replacing proven useful fetch blocks with unproven useful fetch blacks. Therefore, the embodiments may have the advantage of improving performance of the microprocessor and reducing its power consumption. The hotness threshold may be configurable by software running on the microprocessor, which may enable the software (e.g., operating system) to tailor the "hotness" required of a fetch block before it is considered worthy for allocation into the micro-op cache based on characteristics of application software running on the microprocessor and/or other system parameters.

Figure 1:
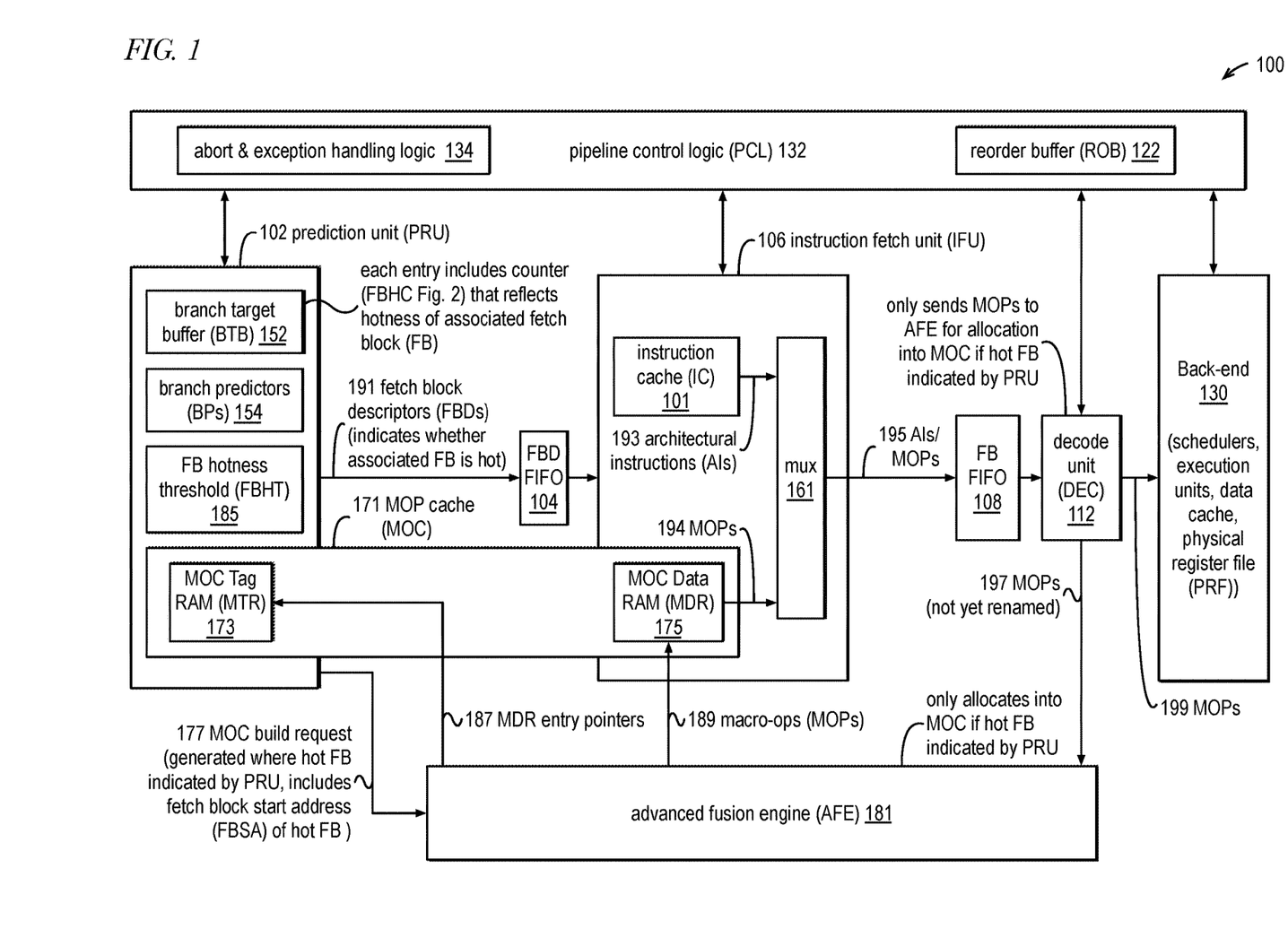
FIG. 1 is an example block diagram of a microprocessor core in accordance with embodiments of the present disclosure.

FIG. 1 is an example block diagram of a microprocessor core 100 in accordance with embodiments of the present disclosure. In the present disclosure, the term macro-op (MOP), rather than micro-op, is used to refer to the micro-architectural operations that are executed by the execution units of the microprocessor. This is because in an embodiment the microprocessor 100 includes an advanced fusion engine (AFE) 181 of FIG. 1 that is configured to perform higher levels of fusion than conventional processors to generate more complex micro-architectural operations, thus the term MOPs. Accordingly, the term macro-op cache (MOC), rather than micro-op cache, is used to refer to the cache memory that caches MOPs. However, the use of BTB hotness counters for selective filtering of new allocations is not limited to embodiments that employ an AFE or MOPs or a MOC, but instead may also be employed in embodiments that do not include an AFE, such as described with respect to FIG. 7, and in which architectural instructions are decoded into micro-ops and allocated into a micro-op cache.

A MOP, like a micro-op, is an instruction that is executable by an execution unit of the microprocessor, as distinct from an architectural instruction which is not executable directly by an execution unit. Stated alternatively, a MOP, like a micro-op, specifies operations and operands within the set of operations and operands defined by the micro-architectural "micro-instruction set architecture" of the execution units of the microprocessor. In other words, MOPs, like micro-ops, are the internal instructions that are actually executed by the execution units, in contrast to architectural instructions that are decoded into MOPs, or micro-ops. Furthermore, a MOP, like a micro-op, may be a fusion of a pair of adjacent architectural instructions decoded into a single MOP/micro-op. In an embodiment, the decode unit (DEC) 112 of the microprocessor 100 of FIG. 1 is configured to fuse a pair of adjacent architectural instructions and decode them into a single MOP.

However, for some sequences of instructions of the program instruction stream, the AFE 181 may be capable of performing more complex fusing of the MOPs generated by the DEC 112 into MOPs. For example, the AFE 181 may be configured to fuse non-adjacent MOPs. For another example, the AFE 181 may be configured to fuse more than two MOPs. For example, the AFE 181 may be configured to examine a window of an entire FB worth of MOPs to look for fusion opportunities among more than two and/or non-adjacent MOPs. For another example, the MOPs may be more complex than conventional micro-ops, yet still have a single-cycle execution latency. For example, the MOPs may be more complex in that they perform compound operations, e.g., two arithmetic/logical operations on three source operands, including input conditioning (e.g., shift or rotate) on some of the source operands and output conditioning (e.g., zero-extend or sign-extend) on the result, i.e., the destination operand.

The core 100 includes an instruction pipeline that includes a predict unit (PRU) 102, a fetch block descriptor (FBD) FIFO 104, an instruction fetch unit (IFU) 106, a fetch block (FB) FIFO 108, a decode unit (DEC) 112, and a back-end 130. In an embodiment, each of the PRU 102, IFU 106, DEC 112, and back-end 130 are also pipelines. The PRU 102 and IFU 106 may be referred to generally as the front-end of the core 100, and the DEC 112 may be referred to as the mid-end. The core 100 also includes pipeline control logic (PCL) 132 that controls various aspects of the microprocessor 100 pipeline as described herein.

The back-end 130, in an embodiment, includes the following functional blocks which are not shown: a physical register file (PRF), a data cache, a plurality of execution units (EUs), and schedulers to which MOPs are dispatched by the DEC 112 and which schedule issuance of the MOPs to the EUs for execution. In an embodiment, the PRF includes separate integer, floating-point and vector PRFs. The DEC 112 may rename architectural registers specified by architectural instructions to physical registers of the PRF. In an embodiment, the EUs include integer execution units (IXUs), floating point units (FXUs), and load-store unit (LSUs). The core 100 may also include a memory management unit (MMU) that includes a data translation lookaside buffer (DTLB), an instruction translation lookaside buffer (ITLB), and a table walk engine (TWE). The ITLB translates a virtual fetch block start address (FBSA) into a physical fetch block start address that is used to fetch a block of architectural instructions from the instruction cache 101 or from system memory.

The core 100 may also include other blocks not shown, such as a load/store queue, a load buffer, a bus interface unit, and various levels of cache memory above the instruction cache 101 and data cache, some of which may be shared by other cores of the microprocessor. Furthermore, the core 100 may be multi-threaded in the sense that it includes the ability to hold architectural state (e.g., program counter, architectural registers) for multiple threads that share the back-end 130, and in some embodiments the mid-end and front-end, to perform simultaneous multithreading (SMT).

The PRU 102 maintains the program counter (PC) and includes predictors that predict program flow that may be altered by control flow instructions, such as branch instructions. In an embodiment, the PRU 102 includes a branch target buffer (BTB) 152, branch predictors (BPs) 154, a FB hotness threshold (FBHT) 185, and a MOC Tag RAM (MTR) 173 portion of a macro-op cache (MOC) 171. The term RAM may be used in the present disclosure to refer to random access memory, such as a static RAM or dynamic RAM, and/or to other types of arrays of addressable storage, such as an array of registers or flip-flops. In an embodiment, the FBHT 185 is configurable by software executing on the microprocessor 100, e.g., via a write to a control register (not shown) of the microprocessor 100. In an embodiment, the BPs 154 include a main conditional branch predictor, a secondary conditional branch predictor, an indirect branch predictor, and a return address predictor. As a result of predictions made by the predictors, the core 100 may speculatively execute instructions in the instruction stream of the predicted path.

The BTB 152 caches information about previously fetched and decoded and executed FBs in the program instruction stream such as the length and termination type of the FB. Each entry of the BTB 152 (described more with respect to FIG. 2) is associated with a FB and includes a FB hotness counter (FBHC)—storage element FBHC 217 of FIG. 2 output by the BTB 152 as FBHC 416 of FIG. 4—that reflects the hotness of the FB associated with the BTB entry. More specifically, the FBHC 217 is incremented each time the BTB entry is hit upon and used as a prediction that the associated FB is present again in the program instruction stream. The FBHC is used in a filtering manner to decide whether to allocate an entry in the MOC 171 for MOPs into which architectural instructions of the FB are decoded. In an embodiment, an entry in the MOC 171 is not allocated unless the value of the FBHC 217 has incremented beyond the FBHT 185.

Figure 3:
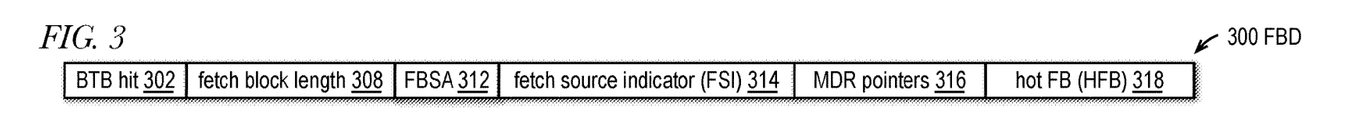
FIG. 3 is an example block diagram of a fetch block descriptor (FBD), in accordance with embodiments of the present disclosure.

The PRU 102 generates fetch block descriptors (FBD) 191, described in more detail with respect to FIG. 3, that are provided to the FBD FIFO 104 in a first-in-first-out manner. Each FBD describes a FB. FBDs are described in detail with respect to FIG. 3. As described above, a FB is a sequential run of architectural instructions in a program instruction stream. A FB has a length and a termination type. A FB may terminate with an unconditional branch instruction or a conditional branch instruction that is predicted taken, or the FB may terminate because the run of instructions reached a maximum sequential FB length, i.e., the FB continues sequentially into the next FB. In an embodiment, a FB may be up to ninety-six bytes long and may contain as many as forty-eight architectural instructions. In an embodiment, a FB may include zero, one or more embedded conditional branch instructions that are not predicted taken. That is, typically embedded conditional branch instructions are not the last instruction of the FB, i.e., the embedded conditional branch instructions are internal to the FB, and the FB is terminated for a reason other than an embedded conditional branch instruction. In other words, an embedded conditional branch instruction is implicitly predicted to be not taken, e.g., because thus far it has never been taken. Unlike a FB-terminating conditional branch instruction, embedded conditional branch instructions are not actively predicted by the branch predictor (e.g., the conditional branch predictor of the BPs 154 of FIG. 4). A FB may also refer to a sequential run of MOPs into which the corresponding sequential run of architectural instructions are decoded. In an embodiment, an FB may contain as many as forty-eight MOPs. The decoded MOPs of a FB may be generated by the AFE, i.e., MOPs some of which may be more highly fused than the simpler MOPs decoded by the DEC 112. Generally, the context will make clear whether a FB of architectural instructions or a FB of MOPs is being described, however in some instances a FB of architectural instructions is referred to herein as an architectural FB (AFB), and a FB of MOPs is referred to herein as a MOC FB (MFB).

The IFU 106 includes an instruction cache 101, a MOC Data RAM (MDR) 175 portion of the MOC 171, and a mux 161. The instruction cache 101 caches architectural instructions previously fetched from system memory. The MOC 171 caches MOPs previously generated by the DEC 112 and/or by the AFE 181. A FBD is essentially a request, also referred to as a fetch request, to fetch architectural instructions (AIs) 193 from the instruction cache 101 or to fetch MOPs 194 from the MDR 175. The IFU 106 uses the FBDs to fetch FBs worth of AIs 193 or MOPs 194 via the mux 161 into the FB FIFO 108, which feeds fetched AIs/MOPs 195 to the DEC 112. In an embodiment, the mux 161 is effectively controlled by a fetch source indicator 314 (see FIG. 3) in a FBD that describes the FB whose AIs/MOPs are being fetched from the instruction cache 101/MDR 175. That is, the mux 161 selects MOPs 194 fetched from the MDR 175 if the fetch source indicator 314 is true, and the mux 161 selects AIs 193 fetched from the instruction cache 101 if the fetch source indicator 314 is false. The FBD FIFO 104 enables the PRU 102 to continue predicting FBDs to reduce the likelihood of starvation of the IFU 106. Likewise, the FB FIFO 108 enables the IFU 106 to continue fetching FBs worth of AIs/MOPs to reduce the likelihood of starvation of the DEC 112. Architectural instructions may travel through the pipeline from the IFU 106 to the DEC 112 as FBs where they are decoded, register-renamed and dispatched in parallel, and MOPs may travel through the pipeline from the IFU 106 to the DEC 112 as FBs where they are register-renamed and dispatched in parallel. Many structures within the core 100 address, buffer, or store information for an instruction or MOP by reference to a FB identifier. In an embodiment, checkpoints for abort recovery are generated for and allocated to FBs. In some instances, the abort recovery process may begin at the first instruction of the FB containing the abort-causing instruction. In other instances, the abort recovery process may begin at the first instruction of the next FB after the FB containing the abort-causing instruction. In other instances, the abort recovery process may begin at an instruction in the middle of the FB containing the abort-causing instruction.

The DEC 112 may decode AIs of the FBs into MOPs. Early stages of the DEC 112 identify instruction boundaries within the FB FIFO 108 that contains the next group of architectural instruction bytes to be decoded and executed and extracts the architectural instructions at the identified boundaries. For example, for RISC-V instructions, the early DEC 112 stages mux out from the FB FIFO 108 the one or two halfwords of instruction bytes that correspond to each architectural instruction starting at an identified instruction boundary. Then, other early stages of the DEC 112 may identify consecutive pairs of architectural instructions that can be fused together. Then early DEC 112 stages may also decode each identified instruction or instruction pair into a corresponding MOP representation. In an embodiment, the DEC 112 includes a pre-decode stage, an extract stage, a rename stage, and a dispatch stage.

In an embodiment, the DEC 112 converts each FB into a series of MOPGroups. Each MOPGroup consists of either N sequential MOPs or, if there are fewer than N MOPs in the FB after all possible N-MOP MOPGroups for a FB have been formed, the remaining MOPs of the FB. In an embodiment, N is five for MOPs decoded from AIs fetched from the instruction cache 101, and N is six for MOPs fetched from the MOC 171. Because some MOPs can be fused by DEC 112 from two instructions, a MOPGroup may correspond to up to 2N instructions. The MOPs of the MOPGroup may be processed in simultaneous clock cycles through later DEC 112 pipe stages, including rename and dispatch to the EU pipelines. Instructions of an MOPGroup are also allocated into the ROB 122 in simultaneous clock cycles and in program order. The MOPs of an MOPGroup are not, however, necessarily scheduled for execution together.

The DEC 112 dispatches MOPs to the schedulers which schedule and issue the MOPs for execution to the EUs. The EUs receive operands for the MOPs from multiple sources including operands from the PRF and results produced by the EUs that are directly forwarded on bypass busses back to the EUs. In an embodiment, the EUs perform superscalar out-of-order speculative execution of multiple MOPs in parallel. The instructions are received by the DEC 112 in program order, and entries in the ROB 122 are allocated for the associated MOPs of the instructions in program order.

However, once dispatched by the DEC 112 to the EUs, the schedulers may issue the MOPs to the individual EU pipelines for execution out of program order.

The PCL 132 includes a ReOrder Buffer (ROB) 122 and exception-handling logic 134. The pipeline units may signal a need for an abort, e.g., in response to detection of a mis-prediction (e.g., by a branch predictor of a direction or target address of a branch instruction, or of a mis-prediction that store data should be forwarded to a load MOP in response to a store dependence prediction) or other microarchitectural exception, architectural exception, or interrupt. In response, the PCL 132 may assert flush signals to selectively flush instructions/MOPs from the various units of the pipeline.

The PCL 132 tracks instructions and the MOPs into which they are decoded throughout their lifetime. The ROB 122 supports out-of-order instruction execution by tracking MOPs from the time they are dispatched from DEC 112 to the time they retire. In one embodiment, the ROB 122 has entries managed as a FIFO, and the ROB 122 may allocate up to six new entries per cycle at the dispatch stage of the DEC 112 and may deallocate up to six oldest entries per cycle at MOP retire. In one embodiment, each ROB entry includes an indicator that indicates whether the MOP has completed its execution and another indicator that indicates whether the result of the MOP has been committed to architectural state. More specifically, load and store MOPs may be committed subsequent to completion of their execution. Still further, a MOP may be committed before it is retired.

The AFE 181 receives MOC build requests 177 from the PRU 102, receives MOPs 197 from the DEC 112, and provides MOPs 189 and MDR pointers 187, described below, to the MOC 171. Generally, when the PRU 102 predicts the presence of a FB in the program instruction stream that the PRU 102 deems to be a hot FB, the PRU 102 generates a true indicator (HFB indicator 318 of FIG. 3) within the FBD 191 associated with the hot FB, and the true indicator proceeds through the microprocessor 100 pipeline (e.g., FBD FIFO 104, IFU 106, FB FIFO 108) to the DEC 112. Additionally, when the PRU 102 predicts the hot FB, the PRU 102 sends a MOC build request 177 to the AFE 181 for the hot FB. A MOC build request 177 is a request by the PRU 102 to the AFE 181 to build, or create, a new entry in the MOC 171. The MOC build request 177 specifies the fetch block start address (FBSA) of the hot FB for which the PRU 102 is requesting the AFE 181 to build an entry in the MOC 171 for the MOPs of the FB. When the DEC 112 fetches the hot FB from the FB FIFO 108 and decodes the fetched architectural instructions into MOPs, the DEC 112 sees from the true indicator that the FB is a hot FB and provides the decoded MOPs to the AFE 181. In response, the AFE 181 further fuses, where possible, the received MOPs into more highly fused MOPs. Then the AFE 181 communicates with the MOC 171 to build an entry in the MOC 171 for the possibly more highly fused MOPs using the FBSA received in the MOC build request 177. Generally, building a new entry in the MOC 171 includes writing the MOPs of the FB to entries of the MDR 175 and writing a new tag entry in the MTR 173 that points to the entries of the MDR 175 to which the MOPs of the FB were written. In an embodiment, the new tag entry in the MTR 173 points to only the initial entries of the MDR 175, and the entries in the MDR 175 themselves point to subsequent entries of the MDR 175. Significantly, what triggers an allocation into the MOC 171 is the detection of a hot FB, not the mere decoding of architectural instructions into MOPs according to conventional methods. Indeed, in the embodiments described, a FB may appear in the program instruction stream and be decoded into MOPs many times (i.e., up to the threshold value) before a MOC allocation is performed. In this sense, the FBHC 217 serves as a filter for MOC allocations.

In an embodiment, the MOPs 199 dispatched by the DEC 112 to the back-end 130 are register-renamed, i.e., the MOPs 199 specify PRF registers as the source and destination operands. However, the MOPs 197 provided by the DEC 112 to the AFE 181 are not register-renamed, i.e., the MOPs 197 specify architectural registers as the source and destination operands. Similarly, the MOPs 189 provided by the AFE 181 to the MOC 171 are not register-renamed. Thus, the MOPs 194 fetched from the MOC 171 are not register-renamed as provided to the DEC 112, and the DEC 112 renames them before dispatching them as register-renamed MOPs 199 to the back-end 130.

In an embodiment, the AFE 181 includes a build request FIFO that is configured to receive the MOC build requests 177 such that multiple MOC build requests 177 from the PRU 102 may be outstanding to the AFE 181 at any time. In an embodiment, the AFE 181 includes a MOP buffer that is configured to receive from the DEC 112 at least all the MOPs 197 of a FB. When the AFE 181 detects that the MOP buffer is not empty, the AFE 181 may begin to use the MOPs 197 in the MOP buffer to build an entry in the MOC 171 for the FB.

As shown in the embodiment of FIG. 1, the MOC 171 includes the MTR 173 in the PRU 102 and the MDR 175 in the IFU 106. In an embodiment, an entry in the MOC 171 comprises one or more entries in the MDR 175 that hold MOPs of the FB and an entry in the MTR 173 that points to the entries in the MDR 175 as will now be described. Thus, in the embodiment, allocation of a MOC entry includes both allocating the MDR entries and the MTR entry and populating them accordingly.

In an embodiment, the MDR 175 is organized as a one-dimensional array of entries each configured to store up to three MOPs and that are managed as a pool of entries. In an embodiment, the pool of MDR entries is managed by control logic in the MTR 173. In an embodiment, each entry of the MDR 175 has an associated array index, referred to herein as an MDR pointer. An MDR entry is either available for allocation in which case it is included in a free list maintained by the MDR 175, or the MDR entry is already allocated for a FB in which case the MDR entry is pointed to by an entry of the MTR 173, as described in more detail below. When an MDR entry is deallocated, it is put back on the free list.

In an embodiment, the MTR 173 is arranged as a set associative structure having S sets and W ways (e.g., S may be 128 and W may be eight). Each valid entry in the MTR 173 includes a tag that corresponds to tag bits of the FBSA of the FB associated with the MOC entry. During allocation of a MOC 171 entry for a hot FB, the AFE 181 provides to the MOC 171 the FBSA of the hot FB (which the AFE 181 received earlier in the MOC build request 177), and the MTR 173 selects an entry to be replaced (e.g., using replacement information described below) and writes the tag bits of the FBSA to the tag of the MTR entry chosen for replacement. During PRU 102 prediction of the current FB, the MTR 173 looks up the current FBSA 412 of FIG. 4 to determine whether the current FBSA 412 hits in the MTR 173 (indicated by MOC hit 414 of FIG. 4). Each entry of the MTR 173 also includes the MDR pointers that point to the entries in the MDR 175 that hold the MOPs of the FB, as will now be described.

When the AFE 181 has generated the possibly more highly fused MOPs for a hot FB, the AFE 181 requests MDR pointers for the MOPs from the MDR 175. The MDR 175 grabs entries from its free list and provides MDR pointers to the grabbed entries back to the AFE 181. The AFE 181 then writes the MOPs to entries of the MDR 175 at the provided MDR pointers. After the AFE 181 has written all the MOPs to the MDR entries, the AFE 181 sends to the MTR 173 the MDR pointers 187 the AFE 181 just used so that the MTR 173 can allocate an MTR entry for the FB. In the case of a subsequent hit of the FBSA 412 in the MTR 173, the MTR 173 outputs the MDR pointers of the hit entry (MDR pointers 416 of FIG. 4) which are included in the FBD 191 (MDR pointers 316 of FBD 300 of FIG. 3) that the PRU 102 outputs and which the IFU 106 uses to fetch the MOPs of the FB from the MDR 175 for provision to the DEC 112.

Advantageously, when the DEC 112 receives the MOPs (rather than architectural instructions) of the FB, the DEC 112 does not need to decode the MOPs but instead may immediately register-rename them and dispatch them to the back-end 130. In an embodiment, the MDR 175 is configured to output two entries of three MOPs per clock cycle for storage of up to six MOPs into an entry of the FB FIFO 108 per clock cycle, and the DEC 112 is configured to receive up to six MOPs per clock cycle from the FB FIFO 108, to register-rename up to six MOPs per clock cycle, and to dispatch to the back-end 130 up to six MOPs per clock cycle.

In an embodiment, the MDR entries associated with a FB are effectively allocated as a linked list. That is, each MDR entry, in addition to the up to three MOPs, also includes a next MDR pointer that points to the next MDR entry in the linked list. In an embodiment, each MTR entry holds the first MDR pointers which are used to fetch the first MDR entries in the linked list, and the MDR pointers in the first fetched MDR entries are used to fetch the next MDR entries in the linked list, and so forth until the last MDR entries in the linked list are fetched. The AFE 181 requests MDR pointers from the MTR 173 as needed to build the linked list of the MOC entry. In an embodiment, the maximum length of a FB is forty-eight MOPs, which may be stored in sixteen MDR entries.

Each set of the MTR 173 includes replacement information that indicates usage history of the FB associated with the entry in each way. The replacement information is used to decide which way to replace in the set selected by the set index bits of the FBSA of the hot FB for which an entry in the MOC 171 is being allocated by the AFE 181. During prediction time by the PRU 102, the current FBSA (FBSA 412 of FIG. 4) is looked up in the MTR 173 to detect a hit.

Although a single core 100 is shown, the techniques described herein for using BTB fetch block hotness counters for selective filtering of MOC allocations are not limited to a particular number of cores. Generally, the use of BTB fetch block hotness counters for selective filtering of MOC allocations may be employed in a microprocessor conforming to various instruction set architectures (ISA), including but not limited to, x86, ARM, PowerPC, SPARC, MIPS. Nevertheless, some aspects of embodiments are described with respect to the microprocessor 100 conforming to the RISC-V ISA, as described in specifications set forth in Volumes I and II of "The RISC-V Instruction Set Manual," Document Version 20191213, promulgated by the RISC-V Foundation. These two volumes are herein incorporated by reference for all purposes. However, the embodiments are not limited to the RISC-V ISA.

Figure 2:
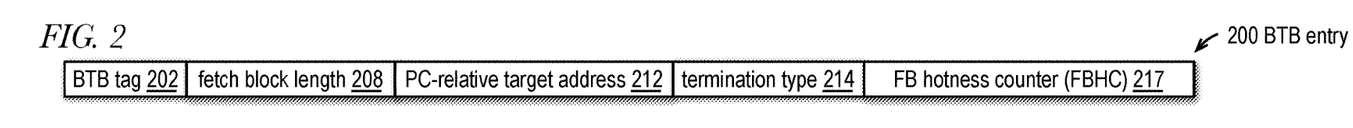
FIG. 2 is an example block diagram of an entry of the branch target buffer (BTB) of FIG. 1, in accordance with embodiments of the present disclosure.

FIG. 2 is an example block diagram of a BTB entry 200, i.e., an entry of the BTB 152 of FIG. 1, in accordance with embodiments of the present disclosure. The BTB entry 200 includes a BTB tag 202, a fetch block length 208, a PC-relative target address 212, a termination type 214, and a FB hotness counter (FBHC) 217. As described below with respect to FIG. 4, a value of the program counter (PC) is used as a current fetch block start address (FBSA), e.g., FBSA 412 of FIG. 4. The FBSA is a virtual address that is translated into a physical address by the ITLB that is looked up in the instruction cache 101 to fetch a FB of instructions from the instruction cache 101. Additionally, the virtual FBSA may be looked up in the MOC 171 to fetch a FB of MOPs from the MOC 171, as described below.

Prior to the fetch of the FB, the FBSA is used to access the BTB 152 (and BPs 154), as described below with respect to FIGS. 4 and 5. If the FBSA misses in the BTB 152, a new BTB entry 200 will be created for the associated FB and allocated into the BTB 152 based on the FBSA and on other information determined from decode and execution of the FB, such as the length and termination type of the FB and possibly the PC-relative target address of a PC-relative terminating branch instruction. In an embodiment, the BTB 152 may operate similarly to the manner described in U.S. patent application Ser. No. 18/093,643 (VENT.0130), filed Jan. 5, 2023, which is hereby incorporated by reference in its entirety for all purposes.

The BTB tag 202 of the new BTB entry 200 is based on the FBSA of the FB. The fetch block length 208 specifies the length in architectural instructions of a FB that starts at the FBSA. As described above with respect to FIG. 1, the FB may be up to the maximum length (e.g., 96 bytes in one embodiment), but may be shorter if a terminating instruction, e.g., a branch instruction, appears before the maximum FB length is reached. The PC-relative target address 212 specifies a target address of a PC-relative branch instruction that may be calculated, e.g., by the decode unit 112, by adding the FBSA and the immediate offset specified in the PC-relative branch instruction.

The termination type 214 specifies the reason for termination of the FB that starts at the FBSA. In one embodiment, the reasons may include: an unconditional branch instruction is present, a conditional branch instruction that is predicted taken is present, or the FB may terminate because the run of instructions reached a maximum sequential FB length, i.e., the FB continues sequentially into the next FB. In one embodiment, the type of the branch instruction may be more specifically indicated, e.g., conditional branch, direct branch, indirect branch, call, return.

The FBHC 217 is an indication of the worthiness of the MOPs of the FB to be allocated into the MOC based on a history of the FB being present in the program instruction stream. When a new BTB entry 200 is allocated into the BTB 152, the FBHC 217 is initialized to a default value. In an embodiment, the default value is one. Each time the BTB entry 200 is hit on when a FBSA is looked up in the BTB 152 and the hit entry 200 is used as a prediction that the FB is present again in the program instruction stream, the FBHC 217 is incremented to indicate an increased worthiness of the FB to have its MOPs allocated into the MOC 171. Preferably, incrementation of the FBHC 217 saturates at its maximum value. In an embodiment, if a MOC build request 177 fails for a subset of reasons, the AFE 181 informs the PRU 102, and the PRU 102 clears the FBHC 217 to zero, which is a special value that indicates a failed build request, which instructs the PRU 102 not to increment the FBHC 217 and not to ever attempt again to build a MOC entry for the FB, or at least not until the BTB entry 200 is replaced, which resets the FBHC 217 to the default value.

FIG. 3 is an example block diagram of a fetch block descriptor (FBD) 300, i.e., an entry of the FBD FIFO 104 of FIG. 1, in accordance with embodiments of the present disclosure. The FBD 300 includes a BTB hit indicator 302, a fetch block length 308, a FBSA 312, a fetch source indicator (FSI) 314, MDR pointers 316, and a hot FB (HFB) indicator 318. As described below with respect to FIG. 4, when the PRU 102 generates an FBD, e.g., FBD 191 of FIG. 4, the FBD is written to the FBD FIFO 104 of FIG. 1 and later fetched from the FBD FIFO 104 for use by the IFU 106 to fetch a FB of architectural instructions from the instruction cache 101 or of MOPs from the MOC 171. The BTB hit indicator 302 indicates whether the lookup of the FBSA hit in the BTB 152. The fetch block length 308 is written with the corresponding fetch block length 208 provided by the BTB 152 in the case of a hit of the FBSA in the BTB 152. The FBSA 312 is the current FBSA 412 of FIG. 4 that was used to access the BTB 152, the BPs 154, and the MTR 173.

Figure 4:
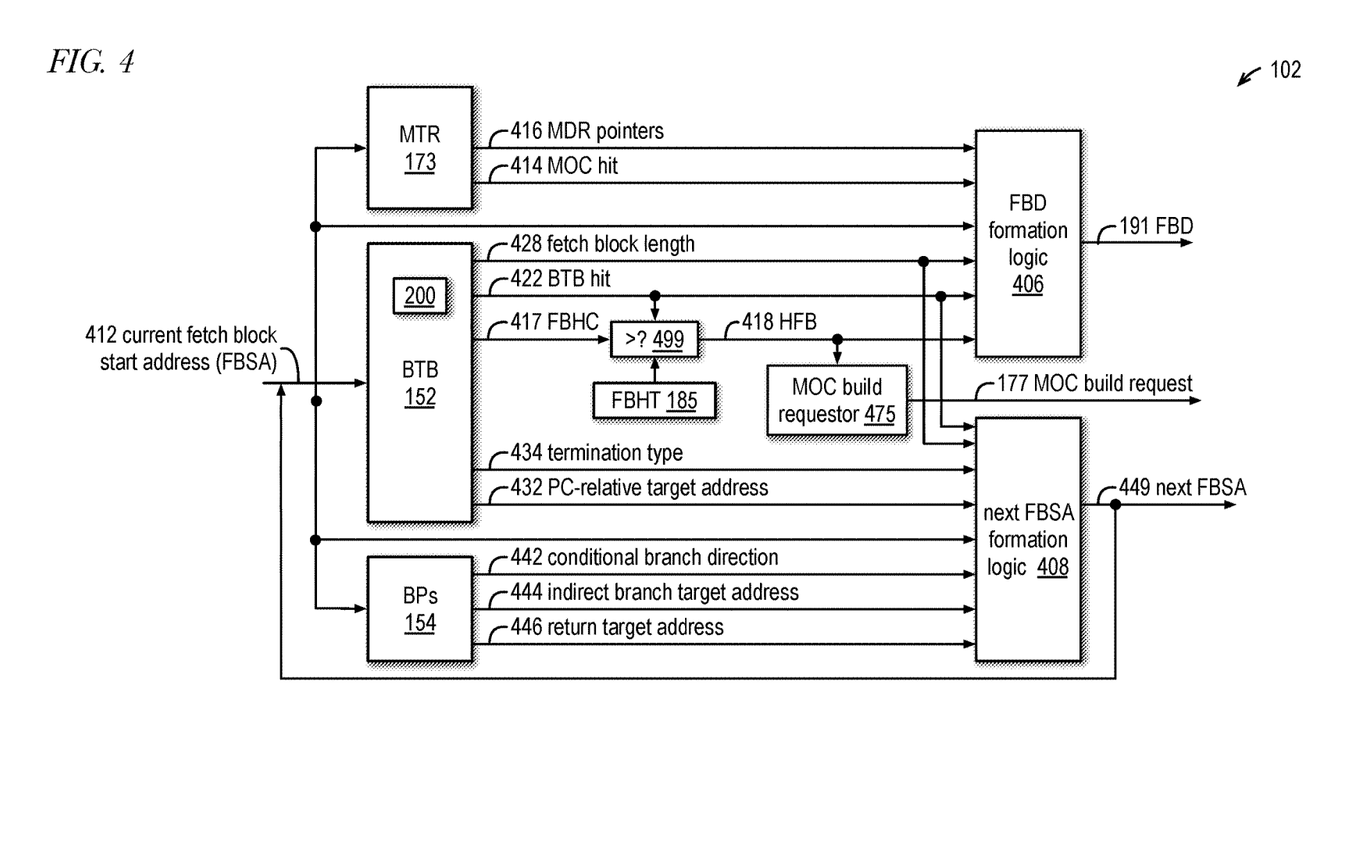
FIG. 4 is an example block diagram of the prediction unit (PRU) of FIG. 1 in accordance with embodiments of the present disclosure.

The FSI 314 is populated (by the FBD formation logic 406 of FIG. 4) based on the MOC hit indicator 414 of FIG. 4 that is output by the MTR 173 of FIG. 1 during a lookup of the FBSA 412 in the MTR 173. As described above with respect to FIG. 1 and below with respect to FIG. 4, the MOC hit indicator 414 indicates whether the current FBSA 412 hit in the MTR 173. Typically, if the MOC hit indicator 414 is true, then the FSI 314 is populated to instruct the IFU 106 to fetch from the MDR 175; otherwise, the FSI 314 is populated to instruct the IFU 106 to fetch from the instruction cache 101. However, in some cases the PRU 102 populates the FSI 314 to instruct the IFU 106 to fetch from the instruction cache 101 even if the MOC hit indicator 414 is true. For example, assume the execution of the MOPs of a FB causes an architectural exception or a microarchitectural exception that causes an abort process to be performed in which the front-end and mid-end are flushed and the MOPs of the FB in the back-end 130 are flushed and the PRU is signaled to restart prediction at the FB. In such case, depending upon the cause of the exception, the PRU may be signaled to instruct the IFU 106 to fetch the AIs of the FB from the instruction cache 101 even though the MOPs of the FB are present in the MOC 171. When the FB described by the FBD 191 is being fetched either from the instruction cache 101 or from the MOC 171, the FSI 314 controls the mux 161, i.e., the mux 161 selects MOPs 194 fetched from the MDR 175 if the FSI 314 indicates the MDR 175, and the mux 161 selects AIs 193 fetched from the instruction cache 101 if the FSI 314 indicates the instruction cache 101.

The MDR pointers 316 are populated (by the FBD formation logic 406 of FIG. 4) with the MDR pointers 416 of FIG. 4 that are output by the MTR 173 during a lookup of the current FBSA 412 in the MTR 173. As described above with respect to FIG. 1 and below with respect to FIG. 4, the MDR pointers 316 point to entries in the MDR 175 that hold MOPs of the FB and that are used by the IFU 106 to fetch MOPs of the FB from the MDR 175.

The hot FB (HFB) indicator 318 is populated (by the FBD formation logic 406 of FIG. 4) with the HFB indicator 418 of FIG. 4 that is output by the comparator 499 of FIG. 4 during a lookup of the FBSA 412 in the BTB 152. As described above with respect to FIG. 1 and below with respect to FIG. 4, a true value on the HFB indicator 318 indicates the PRU 102 has identified the FB as a hot FB because the FBHC 217 of the FB has exceeded the FBHT 185.

FIG. 4 is an example block diagram of the PRU 102 of the microprocessor core 100 of FIG. 1 in accordance with embodiments of the present disclosure. The PRU 102 includes the BTB 152, BPs 154, MTR 173, and FBHT 185 of FIG. 1, as well as FBD formation logic 406, next FBSA formation logic 408, a MOC build requestor 475, and a comparator 499. The PRU 102 receives a current FBSA 412, which is a virtual address that is the start address of the current FB whose presence, length, termination type and other characteristics are being predicted by the PRU 102. In response to the current FBSA 412, the PRU 102 provides a FBD 191 and a next FBSA 449, which is the predicted virtual start address of the next FB following the current FB. The FBD 191 is pushed into the FBD FIFO 104 and includes signals corresponding to the fields of the FBD 300 of FIG. 3. The next FBSA 449 is fed back to become the current FBSA 412 of a subsequent clock cycle.

In the embodiment of FIG. 4, the current FBSA 412 is looked up in the BTB 152, the BPs 154, and the MTR 173. In response, the BTB 152 generates a BTB hit indicator 422 that indicates whether the current FBSA 412 hits in the BTB 152, e.g., whether a tag portion of the current FBSA 412 matches the BTB tag 202 of a valid BTB entry 200 in the set of the BTB 152 selected by a set index portion of the current FBSA 412. If so, the BTB 152 outputs the contents of the hit BTB entry 200 as a corresponding fetch block length 428, PC-relative target address 432, termination type 434, and FBHC 417. Concurrently, the BPs 154 output a conditional branch direction 442, an indirect target address 444, and a return target address 446. Concurrently, the MTR 173 outputs a MOC hit indicator 414 that indicates whether the current FBSA 412 hits in the MTR 173 and, if so, the MDR pointers of the hit entry of the MTR 173 are output as MDR pointers 416 associated with the FB specified by the current FBSA 412.

The comparator 499 compares the FBHC 417 to see if it is greater than the FBHT 185 and, if so and the BTB hit indicator 422 is true, then the comparator 499 generates a true value on a hot FB (HFB) indicator 418, which is also provided to the FBD formation logic 406 and to the MOC build requestor 475, and otherwise generates a false value.

The FBD formation logic 406 receives the BTB hit indicator 422, the fetch block length 428, the current FBSA 412, the MOC hit indicator 414 (possibly modified as described above based on whether an abort was needed for the FB and the exception cause), the MDR pointers 416, and the HFB indicator 418 from the comparator 499 and writes them into the respective fields of FIG. 3 to form a FBD 191 to push into an entry 300 of the FBD FIFO 104.

The next FBSA formation logic 408 receives the BTB hit indicator 422, the fetch block length 428, the PC-relative target address 432, the termination type 434, the conditional branch direction 442, the indirect target address 444, the return target address 446, and the current FBSA 412 and uses them to generate the next FBSA 449. If BTB hit 422 is false, the next FBSA formation logic 408 predicts a maximum length sequential termination type FB. That is, the next FBSA formation logic 408 generates a value of the next FBSA 449 that is the sum of the FBSA 412 and the maximum fetch block length. If BTB hit 422 is true, the next FBSA formation logic 408 generates the next FBSA 449 based on the termination type 434 and the remaining inputs. For example, if the termination type 434 indicates a PC-relative branch, then if the conditional branch direction 442 indicates "taken," the next FBSA formation logic 408 outputs the sum of the current FBSA 412 and the PC-relative target address 432 as the next FBSA 449 and otherwise outputs the sum of the FBSA 412 and the fetch block length 428. If the termination type 434 indicates an indirect branch, the next FBSA formation logic 408 outputs the indirect branch target address 444 as the next FBSA 449. If the termination type 434 indicates a return instruction, the next FBSA formation logic 408 outputs the return target address 446 as the next FBSA 449.

If the HFB 418 is true indicating the current FB is a hot FB, i.e., that its FBHC 217 is greater than the FBHT 185, then the MOC build requestor 475 sends a MOC build request 177 to the AFE 181. As described above with respect to FIG. 1, the MOC build request 177 includes the FBSA of the hot FB. In an embodiment, the MOC build request 177 also includes the number of architectural instructions in the FB. In an embodiment, each entry in the build request FIFO (described above with respect to FIG. 1) may also include status bits that are used by the PRU 102 and the AFE 181 to communicate with one another regarding the status of a MOC build request 177.

Figure 5:
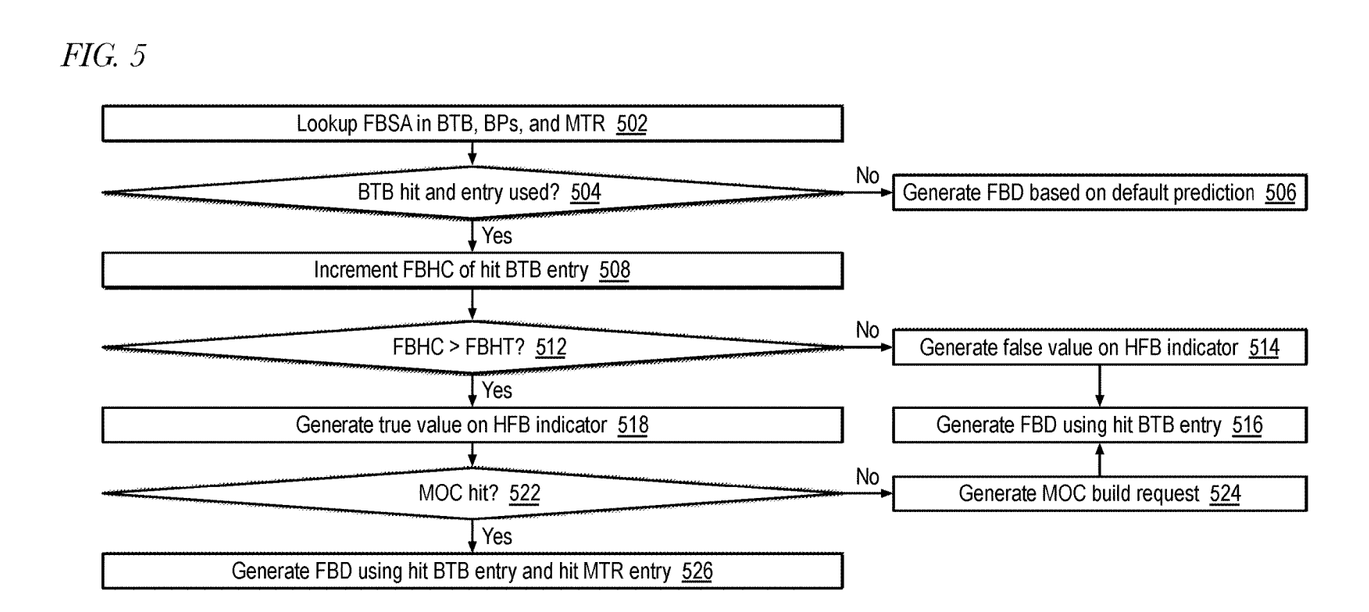
FIG. 5 is an example flowchart illustrating operation of the PRU of FIG. 4 and the role of the fetch block hotness counter (FBHC) of the entries of the BTB in filtering allocations into the macro-op cache (MOC) in accordance with embodiments of the present disclosure.

FIG. 5 is an example flowchart illustrating operation of the PRU 102 of FIG. 4 and the role of the FBHC 217 of the entries 200 of the BTB 152 in filtering allocations into the MOC 171 in accordance with embodiments of the present disclosure. Operations begins at block 502.

At block 502, the FBSA 412 is looked up in the BTB 152, the BPs 154, and the MTR 173. Operation proceeds to decision block 504.

At decision block 504, if a hit occurs in the BTB 152 and the hit entry is used to predict that the FB corresponding to the hit entry 200 of the BTB 152 is present again in the program instruction stream, operation proceeds to block 508; otherwise, operation proceeds to block 506.

At block 506, because the FBSA 412 missed in the BTB 152, the PRU 102 generates a FBD 191 based on a default prediction that the FB is a maximum length sequential FB. Specifically, the FSI 314 is populated to instruct the IFU 106 to fetch the FB from the instruction cache 101 rather than from the MOC 171 and the HFB indicator 318 is also set to false.

At block 508, the FBHC 217 of the hit BTB entry 200 is incremented. In an alternate embodiment, the FBHC 217 is incremented non-speculatively, i.e., only if the architectural instructions of the FB are executed and committed by the back-end 130. In an alternate embodiment, the FBHC 217 is incremented after the comparison at block 512 is performed. Operation proceeds to decision block 512.

At decision block 512, if the value of the FBHC 217 of the hit entry 200 is greater than the FBHT 185, operation proceeds to block 518; otherwise, operation proceeds to block 514.

At block 514, a false value is generated on the HFB indicator 418 to indicate the FB is not a hot FB. Operation proceeds to block 516.

At block 516, since the FB is not a hot FB, the PRU 102 generates a FBD 191 using the hit BTB entry 200. Specifically, the FSI 314 is populated to instruct the IFU 106 to fetch the FB from the instruction cache 101 rather than from the MOC 171 and the HFB indicator 318 is also set to false.

At block 518, a true value is generated on the HFB indicator 418 to indicate the FB is a hot FB. Operation proceeds to decision block 522.

At decision block 522, if a hit occurs in the MOC 171, operation proceeds to block 526; otherwise, operation proceeds to block 524.

At block 524, the PRU 102 generates a MOC build request 177 for the FB and sends it to the AFE 181. Operation proceeds to block 516.

At block 526, since the MOPs of the FB is already in the MOC 171, the PRU 102 generates a FBD 191 using the hit BTB entry 200 and the hit MTR 173 entry. Specifically, the FSI 314 is populated to instruct the IFU 106 to fetch the FB from the MOC 171 rather than from the instruction cache 101 and the MDR pointers 316 are populated with the MDR pointers 416 output by the MTR 173 from the hit MTR 173 entry.

Figure 6:
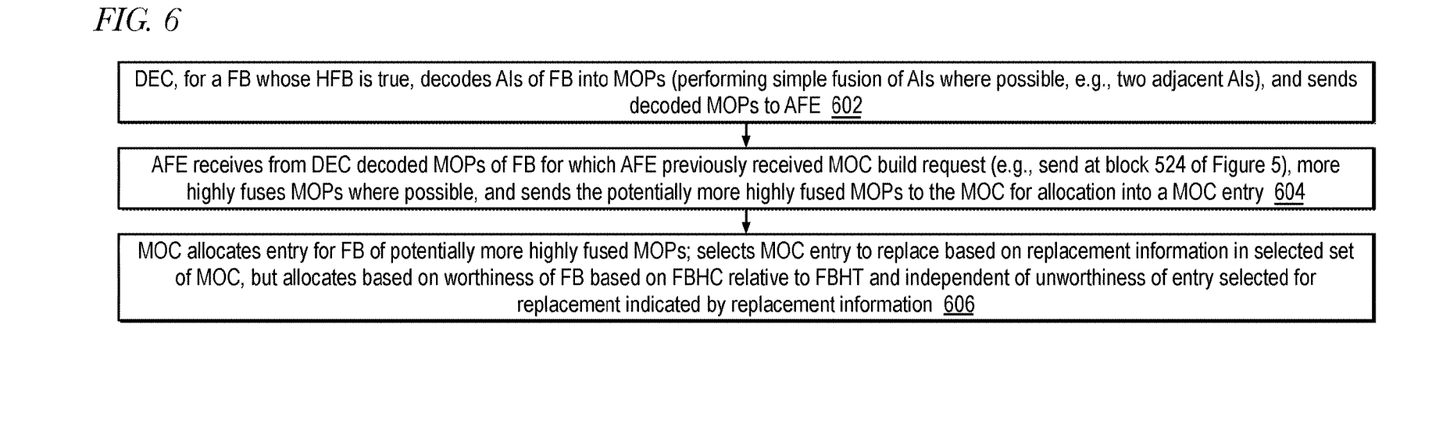
FIG. 6 is an example flowchart illustrating operation of the microprocessor of FIG. 1 to filter the allocation of MOC entries using the FBHC of the entries of the BTB in accordance with embodiments of the present disclosure.

FIG. 6 is an example flowchart illustrating operation of the microprocessor 100 of FIG. 1 to filter the allocation of MOC 171 entries using the FBHC 217 of the entries 200 of the BTB 152 in accordance with embodiments of the present disclosure. Operations begins at block 602.

At block 602, the DEC 112 receives a FB from the FB FIFO 108 for which the HFB indicator 318 is true. In response, the DEC 112 decodes the architectural instructions of the FB into MOPs. In an embodiment, the DEC 112 performs simple fusion of the architectural instructions where possible, e.g., by fusing two adjacent architectural instructions into a single MOP. The DEC 112, before register renaming the decoded MOPs, sends the un-renamed MOPs to the AFE 181. Operation proceeds to block 604.

At block 604, the AFE 181 receives from the DEC 112 the MOPs of the FB sent at block 602. The AFE 181 previously received from the PRU 102 the MOC build request 177 for the FB. The AFE 181 more highly fuses the received MOPs where possible and sends the possibly more highly fused MOPs to the MOC 171 for allocation into an entry of the MOC 171 as described in detail above, e.g., with respect to FIG. 1. Operation proceeds to block 606.

At block 606, the MOC 171 allocates an entry for the FB of possibly more highly fused MOPs received from the AFE 181. The MOC 171 selects the entry to replace based on the replacement information in the set of the MOC 171 selected by the set index portion of the FBSA 412. In particular, the FB was determined to be a hot FB because its corresponding FBHC 217 had exceeded the FBHT 185, e.g., at decision block 512 of FIG. 5, i.e., the FB was determined to be worthy for allocation into the MOC 171. As a result, the MOC 171 allocates an entry for the MOPs of the FB independent of the worthiness or unworthiness of any of the entries of the selected set of the MOC 171 based on the replacement information, including the entry selected for replacement. In other words, the allocation decision is driven by the PRU 102 based on the usage history held in the BTB 152 for the FB being allocated into the MOC 171 rather than being driven by the MOC 171 itself based on the usage history of its current entries.

Figure 7:
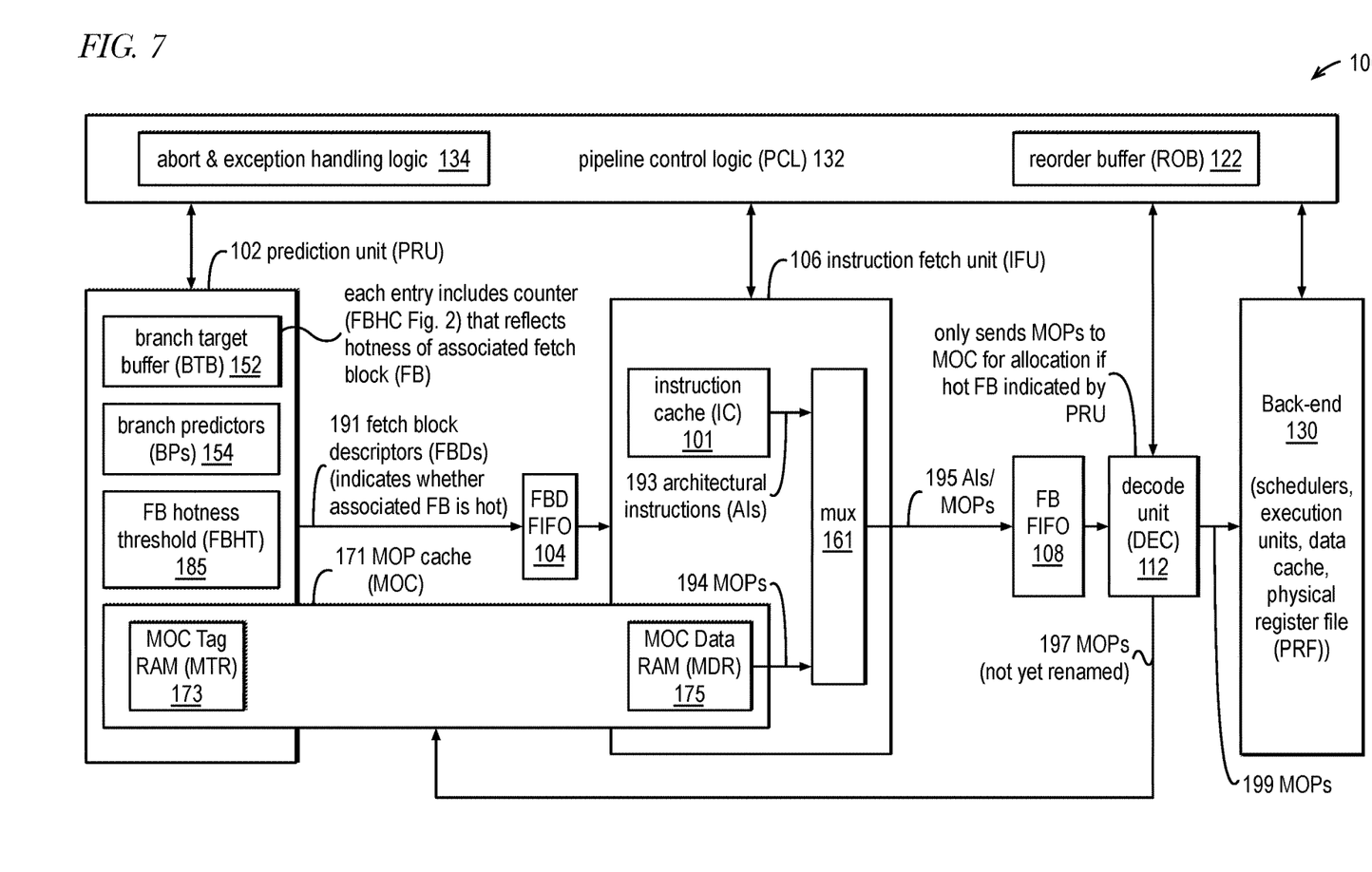
FIG. 7 is an example block diagram of a microprocessor core in accordance with an alternate embodiment of the present disclosure.

FIG. 7 is an example block diagram of a microprocessor core 100 in accordance with an alternate embodiment of the present disclosure. The microprocessor 100 of FIG. 7 is similar in many respects to the microprocessor 100 of FIG. 1. However, the embodiment of FIG. 7 is absent the AFE 181 of FIG. 1. That is, in the embodiment of FIG. 7, the DEC 112 provides the MOPs 197 directly to the MOC 171 if the HFB 418 indicates the FB of the MOPs 197 is a hot FB. In the embodiment, the MOC 171 includes control logic that receives the MOPs 197 and allocates them into the MDR 175 and MTR 173 without further fusing of the MOPs 197. Advantageously, the embodiment of FIG. 7 may also enjoy the advantages of the embodiment of FIG. 1 of improved performance and reduced power consumption afforded by a potentially higher micro-op cache hit rate, e.g., by avoiding replacing proven useful fetch blocks with unproven useful fetch blacks.

It should be understood—especially by those having ordinary skill in the art with the benefit of this disclosure— that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wire line or another communications medium, having instructions stored thereon that are capable of causing or configuring the apparatus and methods described herein.

To aid the Patent Office and any readers of this application and any patent issued on this application in interpreting the claims appended hereto, applicants wish to indicate they do not intend any of the appended claims or claim elements to invoke 35 U.S.C. § 112 (f) unless the words "means for" or "step for" are explicitly used in the particular claim. Furthermore, use of the term "configured to" is not intended to invoke 35 U.S.C. § 112 (f). Still further, uses of the terms "unit" (e.g., as in "prediction unit", "instruction fetch unit", "decode unit", "execution unit", or "logic" (e.g., as in "control logic" or "formation logic") or "element" (e.g., as in "storage element") are intended to connote structure that is included in a microprocessor, which includes circuitry configured to perform disclosed operations, including storage circuitry that stores microcode processed by the circuitry.

The invention claimed is:

1. A microprocessor, comprising:
execution units configured to execute macro-operations (MOPs);
a decode unit that decodes architectural instructions into MOPs;
an instruction fetch unit (IFU) comprising:
   an instruction cache configured to cache architectural instructions fetched from system memory; and
   a macro-operation cache (MOC) configured to cache MOPs into which the architectural instructions are decoded;
   wherein the IFU is configured to detect whether MOPs into which architectural instructions of a fetch block (FB) have been decoded are present in the MOC and, if so, fetch the present one or more MOPs from the MOC for execution by the execution units rather than fetching the one or more architectural instructions from the instruction cache; and
a prediction unit (PRU) configured to predict a series of FBs in a program instruction stream to be fetched by the IFU, wherein the PRU comprises:
   a branch target buffer (BTB) configured to cache information about previously fetched and decoded FBs in the program instruction stream, wherein each entry of the BTB is associated with a FB and comprises:
      a counter that is incremented when the BTB entry is hit upon and used as a prediction that the associated FB is present again in the program instruction stream;
wherein the PRU is configured to, for each FB in the series, generate a true value on an indicator when the counter associated with the FB has exceeded a threshold; and
wherein the microprocessor is configured to, for each FB in the series, use the indicator associated with the FB in a filtering manner to decide whether or not to allocate the MOPs of the FB into the MOC in response to an instance of the decode unit decoding the architectural instructions of the FB into the MOPs of the FB.

2. The microprocessor of claim 1,
wherein the microprocessor is configured to decide to allocate the MOPs of the FB into the MOC only when the indicator is true.

3. The microprocessor of claim 1,
wherein the threshold is configurable by software executing on the microprocessor.

4. The microprocessor of claim 1,
wherein the indicator is provided from the PRU through the IFU to the decode unit for use by the decode unit to decide whether or not to allocate the MOPs of the FB into the MOC.

5. The microprocessor of claim 1,
wherein the decode unit comprises:
   a simple decode unit configured to decode the architectural instructions of a FB into simple MOPs of the FB; and
   a fusion engine configured to receive from the simple decode unit, in response to a true value on the indicator associated with the FB, the simple MOPs of the FB and to further fuse, when possible, the received simple MOPs into fewer and/or more complex MOPs than the received simple MOPs.

6. The microprocessor of claim 5,
wherein in response to detection that the counter associated with the FB has exceeded the threshold, the PRU sends a request to the fusion engine to further fuse the received simple MOPs into the complex MOPs for allocation into the MOC.

7. The microprocessor of claim 1,
wherein a MOP may be a result of a fusion of two or more architectural instructions.

8. The microprocessor of claim 1,
wherein a MOP may include more source operands and/or perform more arithmetical/logical operations than an architectural instruction.

9. The microprocessor of claim 1,
wherein each BTB entry further comprises:
 a length of the associated FB; and
 a termination type from a list comprising: the FB is terminated by a conditional branch instruction, the FB is terminated by an unconditional branch instruction, the FB is terminated because the FB reached a maximum sequential FB length.

10. The microprocessor of claim 1,
wherein the MOC comprises entries arranged as a set associative cache having sets and ways, wherein each set of the MOC includes replacement information used to determine which way of the set to replace upon allocation into the set;
wherein the counter indicates a worthiness of the MOPs of the FB to be allocated into the MOC based on a history of the FB being present in the program instruction stream;
wherein, for each way of the set, the replacement information indicates an unworthiness of the way, relative to the other ways of the set, to remain in the MOC based on a history of the way being present in the program instruction stream since being allocated into the MOC; and
wherein the microprocessor is configured to allocate the MOPs of the FB into the MOC based on their worthiness indicated by the counter relative to the threshold and independent of the unworthiness of the way of the set being replaced.

11. The microprocessor of claim 1,
wherein the BTB is indexed and tagged using a predicted fetch block start address (FBSA) that is looked up in the BTB to determine whether a BTB hit occurs; and
wherein the MOC is also indexed and tagged using the predicted FBSA that is also looked up in the MOC to determine whether a MOC hit occurs indicating that the MOPs of the FB associated with the hit BTB entry are present in the MOC.

12. The microprocessor of claim 11,
wherein the FBSA is a virtual address.

13. The microprocessor of claim 11,
wherein the PRU is configured to provide to the IFU a fetch block descriptor (FBD) that includes the indicator and the FBSA.

14. The microprocessor of claim 1,
wherein the counter is incremented only if the associated FB predicted by the BTB is executed and committed.

15. A method, comprising:
in a microprocessor comprising:
 execution units configured to execute macro-operations (MOPs);
 a decode unit that decodes architectural instructions into MOPs;
 an instruction fetch unit (IFU) comprising:
  an instruction cache configured to cache architectural instructions fetched from system memory; and
  a macro-operation cache (MOC) configured to cache MOPs into which the architectural instructions are decoded;
  wherein the IFU is configured to detect whether MOPs into which architectural instructions of a fetch block (FB) have been decoded are present in the MOC and, if so, fetch the present one or more MOPs from the MOC for execution by the execution units rather than fetching the one or more architectural instructions from the instruction cache; and
 a prediction unit (PRU) configured to predict a series of FBs in a program instruction stream to be fetched by the IFU, wherein the PRU comprises:
  a branch target buffer (BTB) configured to cache information about previously fetched and decoded FBs in the program instruction stream, wherein each entry of the BTB is associated with a FB and comprises:
   a counter that is incremented when the BTB entry is hit upon and used as a prediction that the associated FB is present again in the program instruction stream;
for each FB in the series:
 generating, by the PRU, a true value on an indicator when the counter associated with the FB has exceeded a threshold; and
 using the indicator associated with the FB in a filtering manner to decide whether or not to allocate the MOPs of the FB into the MOC in response to an instance of the decode unit decoding the architectural instructions of the FB into the MOPs of the FB.

16. The method of claim 15,
wherein the MOPs of the FB are allocated into the MOC only when the indicator is true.

17. The method of claim 15,
wherein the threshold is configurable by software executing on the microprocessor.

18. The method of claim 15, further comprising:
providing the indicator from the PRU through the IFU to the decode unit for use by the decode unit to decide whether or not to allocate the MOPs of the FB into the MOC.

19. The method of claim 15, further comprising:
wherein the decode unit comprises:
 a simple decode unit; and
 a fusion engine;
decoding, by the simple decode unit, the architectural instructions of a FB into simple MOPs of the FB;
providing, by the simple decode unit, the simple MOPs of the FB to the fusion engine in response to a true value on the indicator associated with the FB; and
further fusing, by the fusion engine when possible, the simple MOPs into fewer and/or more complex MOPs than the received simple MOPs.

20. The method of claim 19, further comprising:
sending, by the PRU in response to detection that the counter associated with the FB has exceeded the threshold, a request to the fusion engine to further fuse the received simple MOPs into the complex MOPs for allocation into the MOC.

21. The method of claim 15,
wherein a MOP may be a result of a fusion of two or more architectural instructions.

22. The method of claim 15,
wherein a MOP may include more source operands and/or perform more arithmetical/logical operations than an architectural instruction.

23. The method of claim 15,
wherein each BTB entry further comprises:
   a length of the associated FB; and
   a termination type from a list comprising: the FB is terminated by a conditional branch instruction, the FB is terminated by an unconditional branch instruction, the FB is terminated because the FB reached a maximum sequential FB length.

24. The method of claim 15, further comprising:
wherein the MOC comprises entries arranged as a set associative cache having sets and ways, wherein each set of the MOC includes replacement information used to determine which way of the set to replace upon allocation into the set;
wherein the counter indicates a worthiness of the MOPs of the FB to be allocated into the MOC based on a history of the FB being present in the program instruction stream;
wherein, for each way of the set, the replacement information indicates an unworthiness of the way, relative to the other ways of the set, to remain in the MOC based on a history of the way being present in the program instruction stream since being allocated into the MOC; and
allocating the MOPs of the FB into the MOC based on their worthiness indicated by the counter relative to the threshold and independent of the unworthiness of the way of the set being replaced.

25. The method of claim 15,
wherein the BTB is indexed and tagged using a predicted fetch block start address (FBSA) that is looked up in the BTB to determine whether a BTB hit occurs; and
wherein the MOC is also indexed and tagged using the predicted FBSA that is also looked up in the MOC to determine whether a MOC hit occurs indicating that the MOPs of the FB associated with the hit BTB entry are present in the MOC.

26. The method of claim 25,
wherein the FBSA is a virtual address.

27. The method of claim 25, further comprising:
providing, by the PRU, to the IFU a fetch block descriptor (FBD) that includes the indicator and the FBSA.

28. The method of claim 15,
wherein the counter is incremented only if the associated FB is executed and committed.

29. A non-transitory computer-readable medium having instructions stored thereon that are capable of causing or configuring a microprocessor comprising:
   execution units configured to execute macro-operations (MOPs);
   a decode unit that decodes architectural instructions into MOPs;
   an instruction fetch unit (IFU) comprising:
      an instruction cache configured to cache architectural instructions fetched from system memory; and
      a macro-operation cache (MOC) configured to cache MOPs into which the architectural instructions are decoded;
      wherein the IFU is configured to detect whether MOPs into which architectural instructions of a fetch block (FB) have been decoded are present in the MOC and, if so, fetch the present one or more MOPs from the MOC for execution by the execution units rather than fetching the one or more architectural instructions from the instruction cache; and
   a prediction unit (PRU) configured to predict a series of FBs in a program instruction stream to be fetched by the IFU, wherein the PRU comprises:
      a branch target buffer (BTB) configured to cache information about previously fetched and decoded FBs in the program instruction stream, wherein each entry of the BTB is associated with a FB and comprises:
         a counter that is incremented when the BTB entry is hit upon and used as a prediction that the associated FB is present again in the program instruction stream;
   wherein the PRU is configured to, for each FB in the series, generate a true value on an indicator when the counter associated with the FB has exceeded a threshold; and
   wherein the microprocessor is configured to, for each FB in the series, use the indicator associated with the FB in a filtering manner to decide whether or not to allocate the MOPs of the FB into the MOC in response to an instance of the decode unit decoding the architectural instructions of the FB into the MOPs of the FB.

* * * * *